(12) United States Patent
Dittrich et al.

(10) Patent No.: US 11,035,700 B2
(45) Date of Patent: Jun. 15, 2021

(54) GAS SENSOR, MEASURING ELEMENT FOR A GAS SENSOR AND METHOD FOR PREPARING A MEASURING ELEMENT

(71) Applicant: Dräger Safety AG & Co. KGaA, Lübeck (DE)

(72) Inventors: Miriam Dittrich, Ratekau (DE); Erik Stender, Reinfeld (DE); Jürgen Osswald, Hamburg (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 601 days.

(21) Appl. No.: 14/972,709

(22) Filed: Dec. 17, 2015

(65) Prior Publication Data

US 2016/0178412 A1 Jun. 23, 2016

(30) Foreign Application Priority Data

Dec. 18, 2014 (DE) ...................... 10 2014 018 681.4

(51) Int. Cl.
| | | |
|---|---|---|
| *G01N 27/14* | (2006.01) | |
| *G01N 27/16* | (2006.01) | |
| *G01D 11/24* | (2006.01) | |
| *C04B 35/82* | (2006.01) | |

(52) U.S. Cl.
CPC ............ *G01D 11/245* (2013.01); *C04B 35/82* (2013.01); *G01N 27/16* (2013.01)

(58) Field of Classification Search
CPC .................................................... G01N 27/16
See application file for complete search history.

(56) References Cited

U.S. PATENT DOCUMENTS

| | | | |
|---|---|---|---|
| 3,959,764 | A | 5/1976 | Allman |
| 4,077,775 | A | 3/1978 | Lacroix et al. |
| 4,111,658 | A | 9/1978 | Firth et al. |
| 5,601,693 | A | 2/1997 | Davies |
| 2004/0208789 | A1 | 10/2004 | Miller et al. |
| 2005/0220672 | A1 | 10/2005 | Takahashi et al. |
| 2011/0100090 | A1 | 5/2011 | Zanella, Sr. |

FOREIGN PATENT DOCUMENTS

| | | |
|---|---|---|
| CN | 1342263 A | 3/2002 |
| DE | 196 10 912 A1 | 9/1997 |
| DE | 695 31 031 T2 | 11/2003 |
| DE | 696 29 040 T2 | 4/2004 |
| DE | 699 37 578 T2 | 9/2008 |
| DE | 10 2005 050914 B4 | 4/2009 |
| DE | 11 2008 000 824 T5 | 2/2010 |
| DE | 10 2007 032700 B4 | 4/2011 |
| EP | 311964 A * | 4/1989 |
| EP | 1 151 285 B1 | 11/2007 |
| WO | 2011/053866 A1 | 5/2011 |

OTHER PUBLICATIONS

Zhou Meililng, Basis of Materials Engineering, Apr. 2011, pp. 418-419.

* cited by examiner

*Primary Examiner* — Herbert K Roberts
(74) *Attorney, Agent, or Firm* — McGlew and Tuttle, P.C.

(57) ABSTRACT

A gas sensor 100 includes a housing 110 and with a measuring element 10. The measuring element 10 has a heating coil 20, which is coated with a catalytically active or inactive ceramic 30. The ceramic 30 contains a fibrous material. The fibrous material may be, for example, a glass fiber material.

20 Claims, 4 Drawing Sheets

| Measuring element | Example 1 | Example 2 | Example 3 | Example 4 |
|---|---|---|---|---|
| Percentage of fibrous material | - | 0.5 | - | 2.6 |
| Sensitivity to methane [mV/%LEL] | 2.5 | 2.4 | 2.9 | 2.7 |
| Sensitivity to propane [mV/%LEL] | 1.6 | 1.6 | 1.8 | 1.8 |
| Sensitivity to hydrogen [mV/%LEL] | 2.6 | 2.6 | 2.6 | 2.5 |
| Mean zero point voltage [mV] (without damage) | 952 | 925.8 | 999.6 | 970.4 |
| Mean zero point voltage [mV] (after drop from a height of 0.8 m) | 978.8 | 926.8 | 1037.2 | 969.2 |
| Mean difference of the zero point voltages [mV] | 40.4 | 3.8 | 39.2 | 1.6 |

Fig. 2e

GAS SENSOR, MEASURING ELEMENT FOR A GAS SENSOR AND METHOD FOR PREPARING A MEASURING ELEMENT

CROSS REFERENCE TO RELATED APPLICATIONS

This application claims the benefit of priority under 35 U.S.C. § 119 of German Patent Application 10 2014 018 681.4 filed Dec. 18, 2014, the entire contents of which are incorporated herein by reference.

FIELD OF THE INVENTION

The present invention pertains to a gas sensor with a housing and with a measuring element, wherein the measuring element has a heating coil, which is coated with a catalytically active or inactive ceramic, as well as to a measuring element for a gas sensor wherein the measuring element has a heating coil, which is coated with a ceramic and to a method for preparing a measuring element.

BACKGROUND OF THE INVENTION

Gas sensors are typically used to monitor industrial processes, in which combustible gases and vapors may be present at rather high concentrations even during normal operation. Especially so-called heat tone sensors are widely used in this connection for monitoring explosive atmospheres. Such heat tone sensors usually have a measuring element, which is also called Pellistor, and may be used, for example, in portable gas-measuring devices. Direct determination of the explosion hazard in a certain environment can be performed by means of these heat tone sensors. Combustible substances possibly present in a gas mixture present in the surrounding area are catalytically reacted here at the measuring element. An oxidation reaction now takes place, which ultimately leads to a heat tone signal. All combustible gases are reacted in this reaction more or less uniformly by the heat tone sensor, so that it is possible to reliably generate a warning against both known and unknown combustible substances and mixtures of different combustible substances. A great advantage of these sensors consequently lies in the broad-band detection. Further advantages are a low energy consumption, cost-effective design and good compensation of environmental effects. However, one problem that is associated with these sensors is the fact that these sensors lack an absolutely sufficient robustness for some applications. Thus, the measuring element (the Pellistor) usually consists of a platinum wire wound into a coil, which wire is coated with a catalytically active or catalytically inactive ceramic. The catalytically active or inactive ceramic forms a so-called Pellistor bead in this case, which is fastened to contact pins and is held by a base. The corresponding catalytic reaction of the gases to be detected takes place on the surface of a Pellistor bead, which is coated with a catalytically active ceramic. If the sensor is subject to high mechanical loads, the problem may arise that the Pellistor bead will be damaged, so that reliable measurement is no longer possible.

To remedy this, provisions are made, for example, in DE 10 2005 050914 B4 for a swinging suspension of such a gas sensor in a gas-measuring device. If this gas-measuring device is subject to shocks or falls during the operation, an impact can be lessened by the suspension, and the risk of destruction of the Pellistor bead can be prevented. It may, however, be disadvantageous in this case that, especially in case of a compact design of the gas-measuring device, only a limited free space is available for a correspondingly mounted sensor to move. In addition, this design may prevent hermetic sealing of the interior of the gas-measuring device. As a consequence, interfering gases from the interior of the gas-measuring device may prove to be problematic.

WO 2011/053866 A1 provides in this connection for supporting the measuring element, i.e., the Pellistor bead, by additional support wires instead of a swinging suspension of the entire gas sensor. Even though the measuring element is protected here rather well against mechanical effects, the construction is relatively complicated and an undesired removal of heat may occur through the additional support wire.

EP 1 151 285 B1 and DE 10 2007 032700 B4 propose that the Pellistor bead be surrounded with a shock-absorbing material. Even though the bead is protected here as well, the feeding of the gas to be analyzed to the Pellistor bead, especially to the catalytically active surface of the bead, may be hindered by the shock-absorbing material, so that these sensors are possibly only suitable for a limited selection of gases and environments.

SUMMARY OF THE INVENTION

An object of the present invention is to overcome these and other drawbacks of the state of the art and to create an improved gas sensor, especially an improved measuring element for a gas sensor. For example, it is desirable that the gas sensor and the measuring element have a greater mechanical robustness, lower energy consumption and yet high sensitivity to many gases. The gas sensor and the measuring element shall, moreover, be able to be prepared in a simple and cost-effective manner.

In a gas sensor with a housing and with a measuring element, wherein the measuring element has a heating coil, which is coated with a catalytically active or inactive ceramic, the present invention makes provisions for the ceramic to contain a fibrous material.

The housing of such a gas sensor is used in this case, for example, as a mount for the measuring element. The housing may thus be explosion-proof. It is favorable if the housing is at least partially permeable to gases, so that a gas mixture to be analyzed can reach the measuring element. At least one measuring element, which is connected to contacts, which can be lead out of the housing through a contact passage, is preferably arranged in the housing. The measuring element is preferably a Pellistor (a Pellistor bead). A plurality of measuring elements may also be arranged in the housing. For example, a first measuring element, which has a catalytically active ceramic, may be arranged next to a second measuring element, which has a catalytically inactive measuring element. Analytes that are to be detected can be reacted on the surface of the measuring element with the catalytically active ceramic, so that corresponding measured signals are sent when such analytes are present. The measuring element with the catalytically inactive ceramic may be used as a so-called compensation or compensator element (the terms compensation element and compensator element are used synonymously here). Variations in the respective ambient conditions, which could otherwise affect the measured signal, can be compensated by means of such a compensator element.

It is seen, furthermore, that the ceramic may be a catalytically active ceramic if a reaction of the analyte is desired on the surface of the respective measuring element. If the measuring element is a compensator element, it is favorable if the ceramic is catalytically inactive.

The heating coil is a heating and measuring wire. The heating coil has an electric resistance that changes significantly as a function of the temperature. If a catalytic reaction of an analyte that is to be detected takes place on the surface of the ceramic, there will be an increase in temperature at the measuring element due to this oxidation reaction, and there will be a change in the resistance of the heating coil as a consequence. This change in resistance can then be measured correspondingly.

A great advantage of the gas sensor according to the present invention is that the ceramic of the measuring element contains a fibrous material. It is favorable if the fibrous material is resistant to high temperatures. It is also advantageous if the fibrous material is mechanically stable. It is especially advantageous if the fibrous material is inert to catalysts and analytes. In an especially preferred embodiment variant, the fibrous material may possess all three of these properties, i.e., the fibrous material is preferably mechanically stable, withstands high temperatures and is inert to catalysts and analytes. The definition of mechanically stable fibrous material in this application covers both flexible and rigid fibers. It was surprisingly found that the mechanical strength of the measuring element is markedly improved by introducing even small quantities of such fibrous materials into the ceramic of the measuring element, without, however, the measuring properties of the measuring element and hence of the gas sensor being compromised. In a first embodiment variant, the fibrous material may be contained in the ceramic in the form of randomly distributed fibers. The fibers may also form a grid around the coil of the heating coil. For example, that randomly distributed fibers may be rather rigid, whereas fibers that form a grid around the coil of the heating coil may be rather rigid, as it will also appear from the following description of embodiments.

In an especially preferred embodiment, the fibrous material is selected from the group containing glass fibers, microfibers and/or nanofibers or the like, preferably glass fibers, especially preferably fibers consisting of quartz glass, borosilicate, alkali silicate or the like. It is favorable in this connection in any case if the fibrous material is not electrically conductive. In particular, especially glass fibers may be, moreover, flexible and/or movable, which may be advantageous in the preparation of the measuring element, for example, when the fibers shall be distributed randomly in the ceramic. If, by contrast, the fibers shall form a skeleton around the heating coil, it is favorable if glass fibers having the greatest possible rigidity are used as fibrous material. Glass fibers may, moreover, offer the advantage that such glass fibers are inert to catalysts being used and to support materials, which may likewise be contained in the ceramic, even at operating temperatures of, for example, 550° C. It is thus seen that it is favorable if the fibrous material consists of glass fibers, preferably glass fibers consisting of especially temperature-resistant materials, e.g., quartz glass or borosilicate. As an alternative, materials such as, for example, alkali silicates, may also be used at operating temperatures below 500° C.

It is advantageous in any case if the heating coil is a wire consisting of noble metal or a noble metal alloy; preferably a wire that is selected from the group containing platinum, palladium, rhodium, iridium, ruthenium, osmium, tungsten, copper, silver, nickel and the like, as well as alloys of these noble metals; especially preferably a wire that is selected from the group containing platinum, platinum alloys, rhodium alloys and the like. It is favorable in this connection in any case if the material used, from which the wire is prepared, has a high temperature coefficient of the electric resistance. This coefficient is advantageously constant over a broad temperature range. It is thus seen that especially the use of platinum is favorable. The heating coil may be a wire made of platinum. However, the heating coil may be a wire made of a platinum alloy and/or a rhodium alloy, for example, a platinum-rhodium alloy. This can offer a higher strength and consequently improved mechanical robustness of the wire. The measuring element may consequently also have an improved mechanical robustness. In any case, it is favorable if the wire has a diameter not greater than 60 µm. For example, the wire may have a diameter of about 10 µm to about 50 µm. Both wires with a diameter of about 10 µm to about 30 µm and wires with a diameter of about 40 µm to 50 µm may be used. The wire preferably has a diameter of about 20 µm to about 25 µm.

Furthermore, it is favorable if the ceramic contains a catalyst, preferably a catalyst that is selected from the group containing platinum, palladium, rhodium, iridium, ruthenium, oxides of the aforementioned elements, mixtures of the aforementioned elements, mixtures of the oxides of the aforementioned elements as well as mixtures of the aforementioned elements and oxides of the aforementioned elements. The catalyst may then be used to initiate an oxidation reaction on the surface of the ceramic when corresponding combustible gases are contained in a gas mixture that is to be analyzed. The selection of the suitable catalysts is not, of course, limited to the above-mentioned catalysts, but other catalysts may also be used, depending on the particular application. For example, the ceramic may contain a rhodium oxide as a catalyst.

It is also especially favorable if the ceramic has a support, preferably a support that is prepared from nanoparticles, which contain a material that is selected from the group containing metal oxides, metalloid oxides, oxides of the transition metals, combinations of metal, metalloid and/or transition metal oxides and/or the like, especially preferably a support that consists of nanoparticles, which contain a material that is selected from among aluminum, boron, titanium, zirconium, hafnium, yttrium, cerium and silicon oxides and/or combinations or mixtures thereof, especially preferably nanoparticles which consist of aluminum, yttrium, cerium, silicon and/or zirconium oxide as well as mixtures thereof. The use of nanoparticles as a support may offer great advantages, especially if the ceramic is a highly porous ceramic. Such a highly porous ceramic is especially advantageous when the greatest possible enlargement of the catalytically active surface of the measuring element is desired. Corresponding combustible gases can now be reacted not only on the spherical outer surface of the Pellistor bead, but the surface is enlarged due to the highly porous design of the ceramic such that catalytic reactions are also possible in the interior of the ceramic. The gas mixture to be analyzed can penetrate for this into the ceramic through the pores and be reacted within the pores on the existing ceramic surface. The use of nanoparticles as a support offers the advantage in this case that a corresponding porosity can develop during the preparation of the measuring element. This happens especially when nanoparticles are used whose principal components are aluminum oxide, cerium and/or zirconium oxide, especially preferably when a mixture of aluminum oxide and zirconium oxide particles or a mixture of aluminum oxide and cerium oxide particles is used.

It is also favorable in any case if the percentage by weight of the fibrous material relative to the ceramic is at least 0.1% or more, preferably at least 0.5% or more, especially preferably at least 1% or more, and especially preferably at least 2% or more. A marked stabilizing effect of the fibrous material on the mechanical robustness of the ceramic is seen already beginning from a percentage by weight of 0.3%, especially beginning from 0.5%, and especially beginning from 2%.

It is also favorable if the percentage by weight of the fibrous material relative to the ceramic is at most 25% or less, preferably at least 10% or less, especially preferably at most 5% or less, and especially preferably at most 3% or less. Especially low percentages by weight of the fibrous material are advantageous because it was found that they compromise the development of the necessary porosity and of the catalytically active layer of the ceramic only negligibly at the most. It is thus seen that it is advantageous if the percentage by weight of the fibrous material relative to the ceramic is at least 0.1% and at most 25%, preferably at least 0.5% and at most 10%, especially preferably at least 1% and at most 5%, and especially preferably at least 2% and at most 5%. In this connection, the percentage by weight of the fibrous material relative to the ceramic may be at least 0.1% and at most 10% or that the percentage by weight of the fibrous material relative to the ceramic is at least 0.1% and at most 5%, or that the percentage by weight of the fibrous material relative to the ceramic is at least 0.1% and at most 3%. The percentage by weight of the fibrous material relative to the ceramic may also be at least 0.5% and at most 25%, or that the percentage by weight of the fibrous material relative to the ceramic is at least 0.5% and at most 5%, or that the percentage by weight of the fibrous material relative to the ceramic is at least 0.5% and at most 3%. The percentage by weight of the fibrous material relative to the ceramic may be at least 1% and at most 25%, or that the percentage by weight of the fibrous material relative to the ceramic is at least 1% and at most 10%, or that the percentage by weight of the fibrous material relative to the ceramic is at least 1% and at most 3%. Furthermore, the percentage by weight of the fibrous material relative to the ceramic may be at least 2% and at most 25%, or that the percentage by weight of the fibrous material relative to the ceramic is at least 2% and at most 10%, or that the percentage by weight of the fibrous material relative to the ceramic is at least 2% and at most 5%.

It is seen in any case that a gas sensor according to the present invention preferably has a housing with a measuring element, wherein the measuring element has a heating coil, which is coated with a catalytically active or inactive ceramic, said ceramic containing a fibrous material, and said ceramic advantageously containing a catalyst and a support. The catalyst is preferably selected here from among platinum, palladium, rhodium, iridium, ruthenium as well as oxides of the aforementioned elements, especially preferably a rhodium oxide. The support is preferably prepared from nanoparticles, especially from aluminum oxide and zirconium oxide nanoparticles. The heating coil of the gas sensor preferably consists of a platinum wire. The fibrous material of a gas sensor according to the present invention is advantageously a glass fiber material, and the fibers consist especially of quartz glass, borosilicate, alkali silicate or the like. The percentage by weight of the glass fibers relative to the ceramic is preferably at least 0.1% and at most 25%, preferably at least 0.5% and at most 10%, and especially preferably at least 2% and at most 5%.

In another aspect, the present invention provides for a measuring element for a gas sensor according to the present invention. The measuring element has a heating coil, which is coated with a ceramic. It is likewise advantageous in this measuring element if the ceramic contains a fibrous material. The heating coil of such a measuring element is a wire consisting of a noble metal or a noble metal alloy here as well, preferably a wire that is selected from the group containing platinum, palladium, rhodium, iridium, ruthenium, osmium, tungsten, copper, silver, nickel and the like, as well as alloys of these elements, especially preferably a wire that is selected from the group containing platinum, platinum alloys, rhodium alloys and the like. The ceramic is a catalytically active or inactive ceramic in this case as well. It is favorable if the ceramic contains a catalyst and a support, wherein the catalyst is selected from the group containing platinum, palladium, rhodium, iridium, ruthenium as well as oxides of the aforementioned elements, and wherein the support can be prepared from nanoparticles, whose material is selected from the group containing metal oxides, metalloid oxides, oxides of the transition metals, combinations of metal, metalloid and/or transition metal oxides and/or the like. It is thus seen that the ceramic preferably is a ceramic as it was already described above in reference to the gas sensor according to the present invention and that the measuring element may be a measuring element having the features and advantages already described above.

In another aspect, the present invention pertains to a method for preparing a measuring element, namely, to a method for preparing a measuring element according to the present invention for a gas sensor according to the present invention, said method comprising the steps of:
  a providing a heating coil;
  b preparing a coating solution;
  c applying the coating solution;
  d drying and optical calcining;
  e repeating steps c and d until a bead has formed; and
  f calcining the bead.

Step a, namely, the providing of a heating coil, always makes provisions for a corresponding heating coil wire to be bent into a coil. The wire may be shaped such that it has at least two free ends, which can be connected to corresponding contacts of the gas sensor during the assembly of the measuring element. The heating coil wire may be designed, furthermore, as described above. It is especially favorable in this connection if the wire from which the heating coil is bent is a platinum wire, a wire consisting of a platinum alloy or a wire consisting of a rhodium alloy. The coil thus prepared is then intended for being correspondingly embedded in or coated with the coating solution prepared in step b.

The preparation of the coating solution according to step b may be carried out in different ways. The coating solution obtained as a result always contains a catalyst precursor, a support as well as the desired fibrous material. This coating solution is then applied to the heating coil according to step c and dried after the application according to step d. The application corresponding to step c is carried out in thin layers, so that a highly porous bead of dried coating material is formed, on the whole after several repetition of steps c and d. The dried coating material is then calcined according to step f, and the desired ceramic is obtained, and the catalyst precursor reacts into the catalyst.

It is seen that it is favorable if step d and/or step f comprises the application of a heating current. The coating solution is heated in this way, which supports the drying and calcining corresponding to step d and f, respectively.

Provisions are made in a first embodiment variant of the method for step b to have the additional steps of
  b.1 preparing a raw support mass b.2 adding the fibrous material to the raw mass b.3 optionally suspending the mixture of raw support mass and fibrous material obtained in step b2.

The preparation of a raw support mass corresponding to step b.1 may be carried out, for example, by first dissolving a catalyst precursor in a solvent, e.g., distilled water or the like. The dissolution may be carried out while stirring and/or heating. The solution obtained in the process is subsequently mixed with a mixture of support material and suspended in a next step, for example, in an ultrasonic bath (to prepare a suspension). Other procedures are, of course, also be provided.

According to step b.2, the fibrous material can then be added to the solution obtained in this way. The raw support mass, which contains the fibrous material, can be suspended again for optimal mixing before it is applied to the heating coil.

In yet another embodiment variant, provisions may be made for step a to contain the additional steps of a.1 providing a heating coil and a.2 embedding the heating coil in a skeleton of fibrous material.

The providing of the heating coil corresponding to step a.1 corresponds in this case to step a already described generally above, i.e., a corresponding heating coil wire is bent into a coil with at least two ends. This coil is then embedded in a skeleton of fibrous material according to step a.2 before the heating coil thus prepared with the skeleton is coated with a coating solution corresponding to steps b and c. The coating solution, which is used in this case to coat the heating coil, contains a support and a catalyst precursor. The fibrous material is already arranged around the heating coil in this case. A skeleton of fibrous material may be coated with a coating solution wherein the coating solution additionally contains fibrous material.

It is seen in any case that a method according to the present invention is a method for preparing a measuring element, wherein said measuring element is intended for a gas sensor, and wherein the measuring element has a heating coil, which is coated with a ceramic, said ceramic containing a fibrous material.

Further features, details and advantages of the present invention appear from the text of the claims as well as from the following description of exemplary embodiments and drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2e is a table showing a review of measuring tests and changes in the zero point voltage after mechanical damage to measuring elements corresponding to Examples 1 through 4;

DESCRIPTION OF THE PREFERRED EMBODIMENTS

Figure 1:
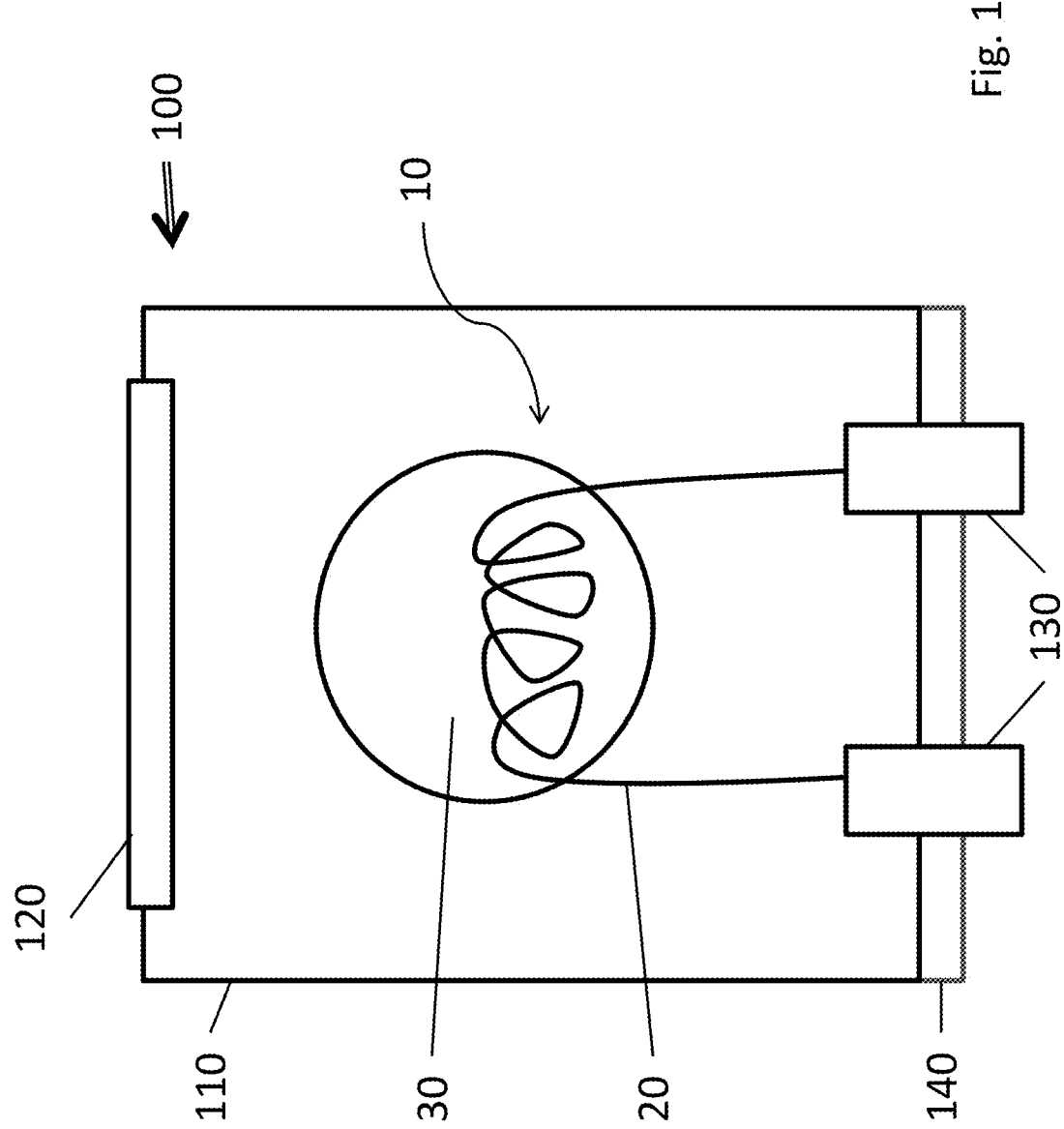
FIG. 1 is a schematic view of a gas sensor according to the present invention with a measuring element according to the present invention.

Referring to the drawings, a gas sensor 100 according to the present invention shown in FIG. 1 has a housing 110 with a gas inlet 120 as well as a measuring element 10 arranged in the housing 110. The gas inlet 120 is sealed with a gas-permeable membrane. The gas inlet 120 is closed in a pressure-tight, explosion-proof manner in one embodiment variant.

The measuring element 10 has a heating coil 20. The heating coil 20 is bent into a coil. The coil is enclosed by a ceramic 30. The ceramic 30 has the shape of a bead. The heating coil 20 and the ceramic 30 together form a Pellistor element, namely, the measuring element 10. The heating coil 20 has two wire ends, which are connected with respective contacts 130 of the gas sensor 100. The contacts 130 are led through a passage 140 to the outer side of the housing 110. It is possible in this way to establish an electrically conductive connection between the measuring element 10 and, for example, a gas-measuring device, into which the gas sensor 100 can be inserted.

The ceramic 30 consists of a mixture of support, catalyst and fibrous material. Different examples of the composition of such a ceramic 30 can be found in Examples 1 through 4 described below.

FIGS. 2a through 2d show different results of drop tests, which were carried out with measuring elements corresponding to the state of the art as well as with measuring elements according to the present invention. The measuring elements shown in FIG. 2a and FIG. 2c, i.e., the measuring elements corresponding to Examples 1 and 3 described below, correspond to the state of the art. The measuring elements shown in FIGS. 2b and 2d, i.e., the measuring elements prepared corresponding to Example 2 and Example 4, respectively, are measuring elements according to the present invention.

Example 1

Figure 2A:
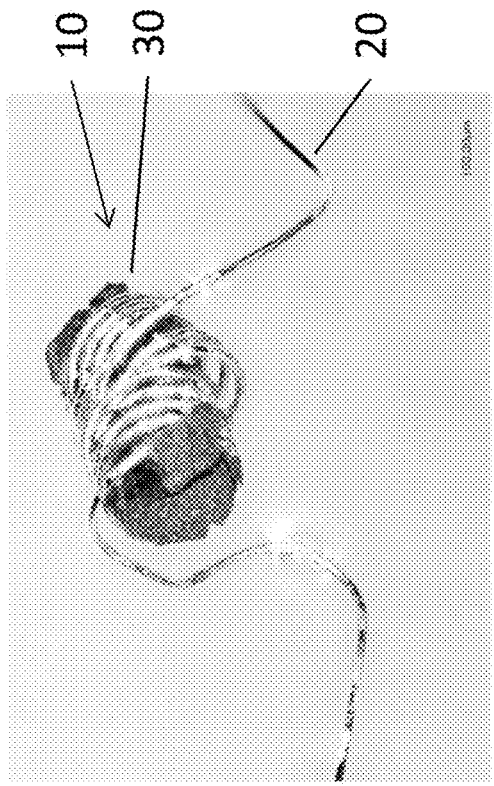
FIG. 2a is a view showing results of drop tests, which was carried out with a measuring element corresponding to the state of the art according to FIG. 1.

To prepare a measuring element 10, as it can be seen in FIG. 2a, 2 g of tris(ethylenediamine) rhodium(III) trichloride hydrate (Alfa Aesar, 10553) are dissolved in 10 mL of distilled water while stirring at approx. 50° C. Then, 200 mg of aluminum oxide (BDH Chemicals, 33138 2S) and 100 mg of zirconium dioxide (Sigma Aldrich, 544760) are added to 1 mL of the solution obtained and suspended in an ultrasonic bath for 10 minutes. The suspension is subsequently applied step by step to a platinum coil (diameter 25 μm, Heraeus), which forms the heating coil 20. Each step of application is followed by a drying step by sending a heating current of 70 mA through the platinum wire. The bead obtained in the preceding steps is calcined after the last coating and drying operation by setting the operating current of 115 mA. The rhodium salt, which is contained as a catalyst precursor in the coating solution, is converted now into rhodium oxide.

Example 2

Glass fibers are provided as fibrous material to prepare a measuring element 10 according to the present invention with a corresponding ceramic 30. Commercially available glass fibers may be used, or the glass fibers are prepared from glass fiber mat as follows: 0.5 g of glass fiber mat (Munktell, MK360) is chopped into small pieces and added to 50 mL of distilled water. The glass fibers are then stirred gently for 24 hours, so that they can swell. The swollen mass of glass fiber mat, in which the glass fibers are present randomly and freely, is then dried at 60° C. for about 6 hours.

As was already described for Example 1, a suspension of 1 mL of tris(ethylenediamine) rhodium(III) trichloride solution, to which aluminum oxide and zirconium oxide were added, is then prepared and mixed with 2 mg of the dried glass fibers. The coating solution thus prepared is treated in an ultrasonic bath for 10 minutes. The suspension is then applied, as was likewise described for Example 1, to a platinum coil, and a Pellistor bead is obtained in this way. A heating current is also applied here after each application step for drying, and a corresponding operating current is set after the last coating and drying step to calcine the detector bead corresponding to Example 1.

The measuring elements 10 obtained corresponding to Example 2 have a ceramic 30 that contains approx. 0.5 wt. % of glass fibers relative to the ceramic.

Example 3

To prepare an alternative measuring element 10, which likewise corresponds to the state of the art, 2 g of tris-ethylenediamine) rhodium(III) trichloride hydrate (Alfa Aesar, 10553) are again dissolved in 10 mL of distilled water while stirring at approx. 50° C. Then, 200 mg of aluminum oxide (BDH Chemicals 33138 2S) and 75 mg of cerium oxide (Sigma Aldrich, 544841) are added to 1 mL of the solution obtained and suspended in an ultrasonic bath for 10 minutes. The further procedure is carried out as described already for Example 1 in this case as well.

Example 4

To prepare an alternative measuring element 10 according to the present invention corresponding to FIG. 2d, glass fibers are again provided first as a fibrous material. To do so, 0.5 g of glass fiber mat (Whatman, GF/D) is added to 50 mL of distilled water and stirred gently for 24 hours. The swollen mass of glass fiber mat, in which the glass fibers will subsequently occur randomly and freely, is then dried at 60° C. for 6 hours.

As described already for Example 3, a suspension of rhodium salt solution, aluminum oxide and cerium dioxide is prepared. Ten mg of the dried glass fibers are added to 1 mL of this suspension. The mixture is treated in an ultrasonic bath for 10 minutes. The further procedure is carried out corresponding to the procedure described above for Example 3 and Example 1.

Measuring elements 10, whose ceramic 30 contains a percentage by weight of about 2.6% of glass fibers relative to the ceramic, are obtained.

Figure 2B:
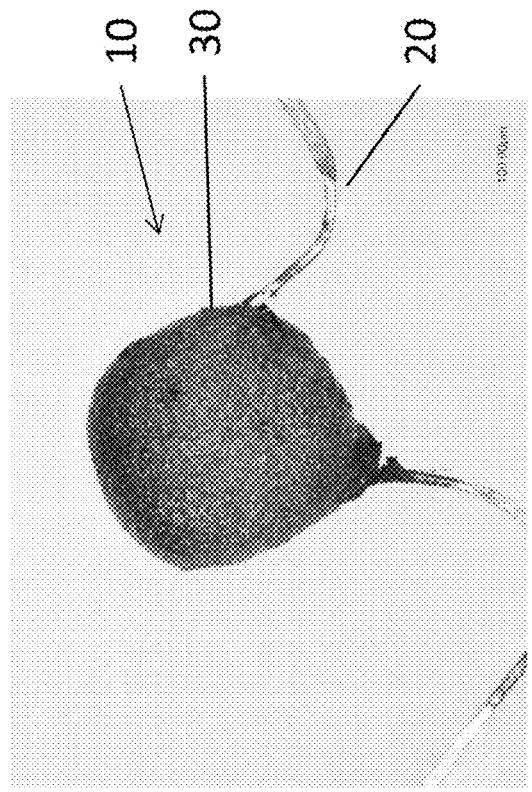
FIG. 2b is a view showing results of drop tests, which was carried out with a measuring element according to the present invention according to Example 2.
Figure 2C:
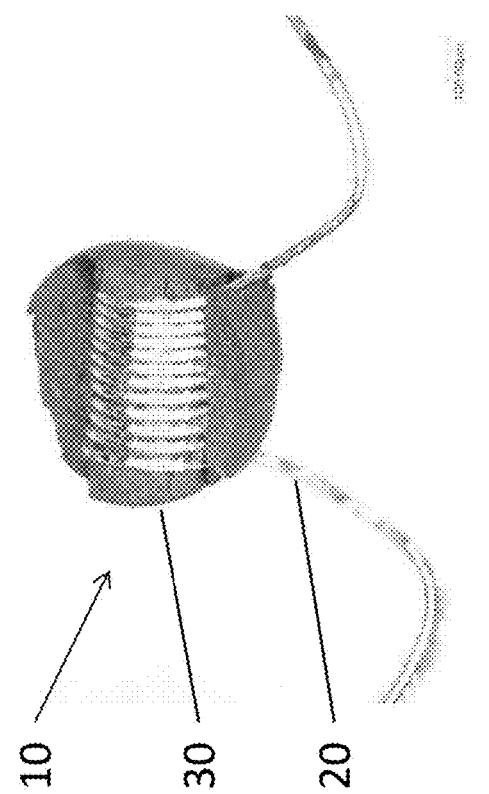
FIG. 2c is a view showing results of drop tests, which was carried out with a measuring element corresponding to the state of the art according to Example 3.
Figure 2D:
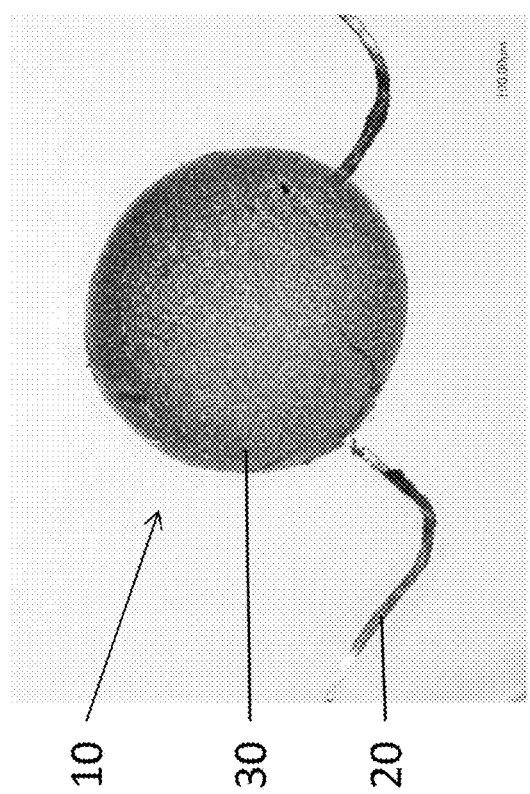
FIG. 2d is a view showing results of drop tests, which was carried out with a measuring element according to the present invention according to Example 4.
Figure 4:
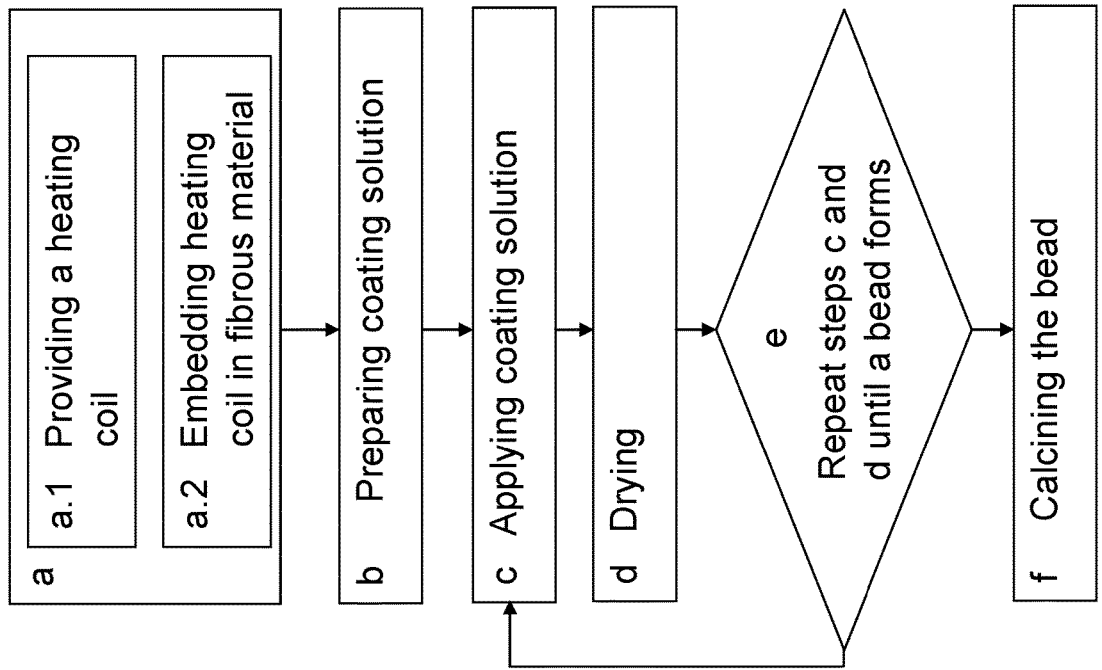
FIG. 4 is a schematic view of an alternative method for preparing a measuring element according to the present invention.
Figure 3:
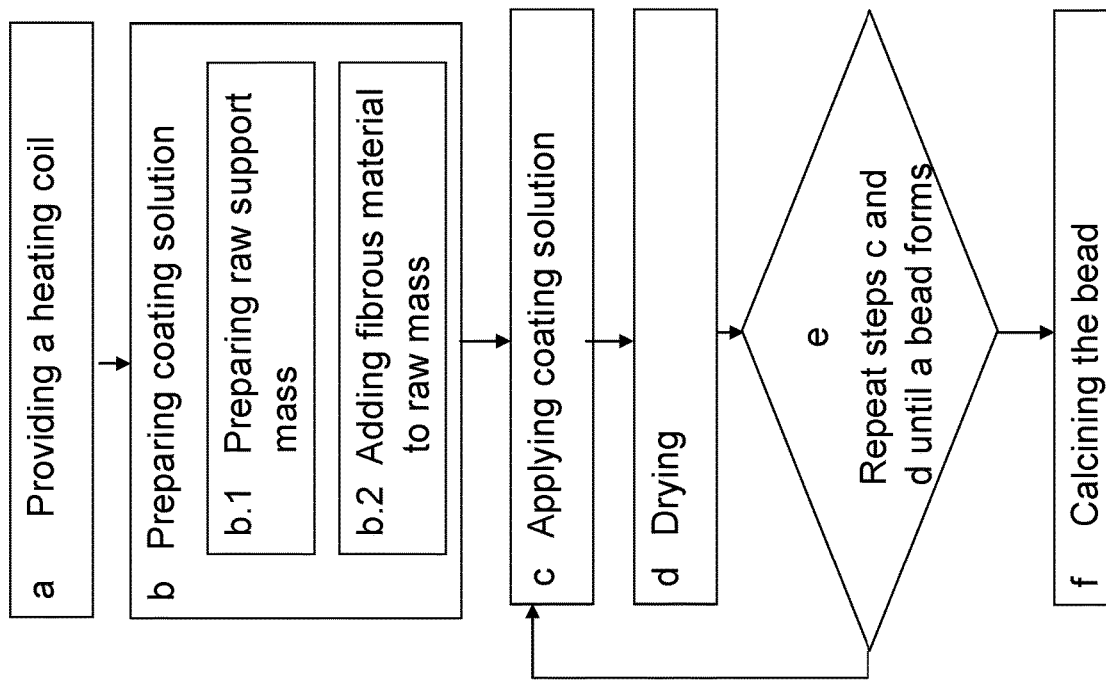
FIG. 3 is a schematic view of a method according to the present invention for preparing a measuring element according to the present invention.

It is thus seen that both the measuring element 10 corresponding to the exemplary embodiment shown in FIG. 1a and the measuring elements 10 corresponding to FIGS. 2b and 2d represent a measuring element 10 that has a heating coil 20, which is coated with a ceramic 30, and said ceramic 30 contains a fibrous material. The fibrous material is selected here from the group containing glass fibers, microfibers and/or nanofibers or the like, namely, glass fibers, especially quartz glass, borosilicate, alkali silicate or the like. The heating coil 20 is a wire consisting of noble metal or a noble metal alloy, preferably a wire that is selected from the group containing platinum, palladium, rhodium, iridium, ruthenium, osmium, tungsten, copper, silver, nickel and the like, as well as alloys of these elements, namely, platinum or a platinum-rhodium alloy, especially platinum. The ceramic 30 contains a catalyst, namely, a catalyst that is selected from the group containing platinum, palladium, rhodium, iridium, ruthenium as well as oxides of the aforementioned elements, namely, rhodium oxide. The ceramic 30 contains, in addition, a support, preferably a support that is prepared from nanoparticles, whose material is selected from the group containing metal oxides, metalloid oxides, oxides of the transition metals, combinations of metal, metalloid and/or transition metal oxides and/or the like, namely, especially nanoparticles that consist of aluminum oxide, zirconium oxide or cerium dioxide, as well as combinations of aluminum oxide and zirconium oxide or aluminum oxide and cerium oxide.

The percentage by weight of the fibrous material relative to the ceramic is at least 0.1% and at most 25%, namely, at least 0.5% and at most 5%.

It is seen, furthermore, that the measuring element 10 prepared corresponding to FIG. 2b and FIG. 2d as well as FIG. 1 is prepared according to a method that contains the steps of:
  a providing a heating coil 20;
  b preparing a coating solution;
  c applying the coating solution;
  d drying;
  e repeating steps c and d until a bead 30 has formed; and
  f calcining the bead 30.

Steps d and f of the method comprise the application of a heating current. Furthermore, step b of this method comprises the steps of
  b1 preparing a raw support mass,
  b2 adding the fibrous material to the raw mass, and
  b3 suspending the mixture of raw support mass and fibrous material obtained in step b2.

The measuring elements 10 prepared corresponding to Examples 1, 2, 3 and 4 were tested subsequent to their preparation for both their sensitivity to combustible gases and robustness to harmful mechanical effects. It is seen corresponding to FIG. 2e that no significant drop can be detected in sensitivity to methane, propane or hydrogen between the measuring elements 10 according to the present invention corresponding to Example 2 and Example 4 and measuring elements 10 that correspond to the state of the art according to Example 1. Thus, a measuring element corresponding to Example 1 has a sensitivity of 2.5 mV/% LEL to methane, 1.6 mV/% LEL to propane and 2.6 mV/% LEL to hydrogen. A measuring element 10 mixed with 0.5 wt. % of fibrous material corresponding to Example 2 has a sensitivity of 2.4 mV/% LEL to methane, 1.6 mV/% LEL to propane and 2.6 mV/% LEL to hydrogen. The mixing of the ceramic 30 with glass fibers corresponding to the above-described examples does not consequently affect the desired sensitivity of the measuring elements 10. This is also seen in Examples 3 and Example 4. The measuring element 10 corresponding to Example 3 has, as can be seen in FIG. 2, a sensitivity of 2.5 mV/% LEL to methane, 1.8 mV/% LEL to propane and 2.5 mV/% LEL to hydrogen. The corresponding comparable measuring element 10 according to Example 4, which contains 2.6% of fibrous material, has a sensitivity of 2.7 mV/% LEL to methane, 1.8 mV/% LEL to propane and 2.5 mV/% LEL to hydrogen.

The measured values are always mean values from six measuring elements 10 of a corresponding example.

To determine the mechanical robustness of the measuring elements 10, drop tests were carried out with the measuring elements 10. The measuring elements 10 were adapted for this into a metallic carrier and dropped in a drop pipe from a height of 0.80 m onto a steel plate.

The so-called zero point voltage was determined before and after the drop test. The zero point voltage is the voltage drop of the measuring elements 10 when they are operated with an operating current of 110 mA in air. As can be determined from Table 1 below, six measuring elements 10 were again always used for each Example 1 through 4.

TABLE 1

| Measuring element corresponding to | Zero point voltage [mV] before drop test | Zero point voltage [mV] after drop from a height of 0.8 m | Difference [mV] before and after the drop test |
| --- | --- | --- | --- |
| Example 1 | 952 | 1011 | 59 |
|  | 943 | 966 | 23 |
|  | 956 | 968 | 12 |
|  | 949 | 915 | −34 |
|  | 960 | 1034 | 74 |
| Example 2 | 910 | 910 | 0 |
|  | 935 | 941 | 6 |
|  | 904 | 900 | −4 |
|  | 933 | 930 | −3 |
|  | 947 | 953 | 6 |
| Example 3 | 981 | 1025 | 44 |
|  | 1001 | 997 | −4 |
|  | 1027 | 1091 | 64 |
|  | 991 | 1057 | 66 |
|  | 998 | 1016 | 18 |
| Example 4 | 974 | 971 | −3 |
|  | 959 | 958 | −1 |
|  | 992 | 992 | 0 |
|  | 941 | 942 | 1 |
|  | 986 | 983 | −3 |

FIG. 2e shows, for each example corresponding to the above-described Examples 1 through 4, the mean zero point voltage in mV before the drop test (mean zero point voltage [mV] (not damaged), as well as the mean zero point voltage after a drop from a height of 0.8 m (mean zero point voltage [mV] (after drop from a height of 0.8 m)) as well as the mean difference between the zero point voltage before and after the drop test (mean difference of the zero point voltage [mV]). The mean zero point voltage is 952 mV before the drop test and 978.8 mV after the drop from a height of 0.8 m for the measuring elements 10 that were prepared corresponding to Example 1. Consequently, a mean difference of 40.4 mV can be detected. A correspondingly great mean difference can also be found for the measuring elements 10 that were prepared corresponding to Example 3. Thus, the mean zero point voltage is 999.6 mV before the drop test and 1,037.2 mV after the drop test for these measuring elements 10. The mean difference of the zero point voltage is consequently 39.2 mV in case of measuring elements 10 corresponding to Example 3. Measuring elements 10 according to the present invention corresponding to Example 2 and Example 4 show, by contrast, a markedly reduced difference in the zero point voltage. Thus, the mean zero point voltage is 925.8 mV before the drop test and 926.8 mV after the drop test for measuring elements 10 corresponding to Example 2. The mean difference of the zero point voltage is 3.8 mV. The mean difference is even smaller in case of measuring elements 10 that were prepared corresponding to Example 4. Thus, the mean zero point voltage is 970.4 mV before the drop test and 969.2 mV after the drop test. The mean difference of the zero point voltage equals 1.6 mV for these measuring elements 10. It is thus seen in FIG. 2e that the mechanical robustness of the measuring elements 10, which contain fibrous material in the ceramic 30, is markedly improved. At the same time, the desired sensitivity to combustible gases is preserved.

The present invention is not limited to one of the above-described embodiments but may be varied in many different ways.

All the features and advantages, including design details, arrangement in space and method steps, which appear from the claims, the description and the drawings, may be essential for the present invention both in themselves and in many different combinations.

While specific embodiments of the invention have been shown and described in detail to illustrate the application of the principles of the invention, it will be understood that the invention may be embodied otherwise without departing from such principles.

What is claimed is:

1. A gas sensor comprising:
a housing; and
a measuring element connected to the housing, the measuring element comprising a heating coil coated with a catalytically active or inactive ceramic, wherein the ceramic contains a fibrous material, the ceramic surrounding at least a portion of the heating coil.

2. A gas sensor in accordance with claim 1, wherein the fibrous material comprises one or more fibrous material selected from the group containing glass fibers, microfibers and nanofibers, the heating coil comprising a plurality of coiled portions, the ceramic completely surrounding each of the coiled portions.

3. A gas sensor in accordance with claim 2, wherein the fibrous material comprises glass fibers comprising one or more of quartz glass, borosilicate and alkali silicate, each of said coiled portions extending about a longitudinal axis, wherein at least a portion of said ceramic is located radially inward of each of said coiled portions with respect to said longitudinal axis and at least another portion of said ceramic is located radially outward of each of said coiled portions with respect to said longitudinal axis.

4. A gas sensor in accordance with claim 1, wherein the heating coil comprises a wire comprised of a noble metal or a noble metal alloy, wherein the wire is selected from the group containing platinum, palladium, rhodium, iridium, ruthenium, osmium, tungsten, copper, silver, nickel and alloys containing platinum, palladium, rhodium, iridium, ruthenium, osmium, tungsten, copper, silver, nickel, wherein the fibrous material is located at least beyond the heating coil.

5. A gas sensor in accordance with claim 1, wherein the ceramic contains a catalyst selected from the group containing platinum, palladium, rhodium, iridium and ruthenium, oxides of platinum, palladium, rhodium, iridium and ruthenium, mixtures containing platinum, palladium, rhodium, iridium and ruthenium, mixtures of oxides of platinum, palladium, rhodium, iridium and ruthenium and mixtures containing platinum, palladium, rhodium, iridium and ruthenium with oxides of platinum, palladium, rhodium, iridium and ruthenium.

6. A gas sensor in accordance with claim 1, wherein the ceramic contains a support prepared from nanoparticles, which contain a material that is selected from the group containing metal oxides, metalloid oxides, oxides of the transition metals, combinations of metal, metalloid and transition metal oxides.

7. A gas sensor in accordance with claim 6, wherein the nanoparticles contain a material that is selected from among oxides of aluminum, boron, titanium, zirconium, hafnium, yttrium, cerium and silicon, zirconium oxide and combinations or mixtures of two or more of aluminum, boron, titanium, zirconium, hafnium, yttrium, cerium, silicon oxides and zirconium oxide.

8. A gas sensor in accordance with claim 1, wherein a percentage by weight of the fibrous material relative to the ceramic is at least 0.1% or more.

9. A gas sensor in accordance with claim 1, wherein the percentage by weight of the fibrous material relative to the ceramic is at most 25%.

10. A gas sensor in accordance with claim 1, wherein the percentage by weight of the fibrous material relative to the ceramic is at least 0.5% and at most 10%.

11. A measuring element for a gas sensor, the measuring element comprising a heating coil coated with a ceramic, wherein the ceramic contains a fibrous material, the ceramic surrounding at least a portion of the heating coil.

12. A measuring element in accordance with claim 11, wherein the heating coil comprises a wire consisting of noble metal or a noble metal alloy selected from the group containing platinum, palladium, rhodium, iridium, ruthenium, osmium, tungsten, copper, silver, nickel and alloys containing platinum, palladium, rhodium, iridium, ruthenium, osmium, tungsten, copper, silver, nickel, the ceramic surrounding at least a portion of the wire, the heating coil comprising a plurality of coiled portions, the ceramic completely surrounding each of the coiled portions, wherein the ceramic, including the fibrous material, is provided at least beyond the heating coil.

13. A measuring element in accordance with claim 11, wherein:
the ceramic contains a catalyst and a support;
the catalyst is selected from the group containing platinum, palladium, rhodium, iridium, ruthenium as well as oxides of platinum, palladium, rhodium, iridium, ruthenium;
the support is prepared from nanoparticles, of nanoparticle material selected from the group containing metal oxides, metalloid oxides, oxides of the transition metals, combinations of two or more of metal, metalloid and transition metal oxides;
the fibrous material is located at least at a position beyond the heating coil.

14. A gas sensor in accordance with claim 1, wherein the fibrous material is inert to catalysts and analytes.

15. A gas sensor in accordance with claim 1, wherein the fibrous material comprises glass fibers, wherein a percentage by weight of the fibrous material relative to the ceramic is at least 0.5% or more and at most 5% or less.

16. A measuring element in accordance with claim 11, wherein the fibrous material is inert to catalysts and analytes, the heating coil comprising a plurality of coiled portions, each of said coiled portions extending about a longitudinal axis, wherein at least a portion of said ceramic is located radially inward of each of said coiled portions with respect to said longitudinal axis and at least another portion of said ceramic is located radially outward of each of said coiled portions with respect to said longitudinal axis.

17. A measuring element in accordance with claim 11, wherein the fibrous material comprises glass fibers, wherein a percentage by weight of the fibrous material relative to the ceramic is at least 0.5% or more and at most 5% or less.

18. A measuring element for a gas sensor, the measuring element comprising:
a heating coil;
a structure enclosing at least a portion of said heating coil, said portion of said heating coil comprising an outer circumferential surface, said structure comprising a ceramic and a fibrous material, said structure being in direct contact with each portion of said outer circumferential surface.

19. A gas sensor in accordance with claim 18, wherein the fibrous material is inert to catalysts and analytes, said heating coil comprising a plurality of coiled portions, said structure completely surrounding each portion of each of said coiled portions, wherein the fibrous material is located at least beyond the heating coil.

20. A gas sensor in accordance with claim 18, wherein the fibrous material comprises glass fibers, wherein a percentage by weight of the fibrous material relative to the ceramic is at least 0.5% or more and at most 5% or less, wherein the ceramic and fibrous material define a catalytically active structure having an outermost surface for a catalytic reaction of an analyte, the outermost surface being located at a space location from the heating coil.

* * * * *